March 12, 1940.  R. H. SUMMERS ET AL  2,192,957
IGNITION GOVERNOR
Original Filed Nov. 19, 1934   3 Sheets-Sheet 1
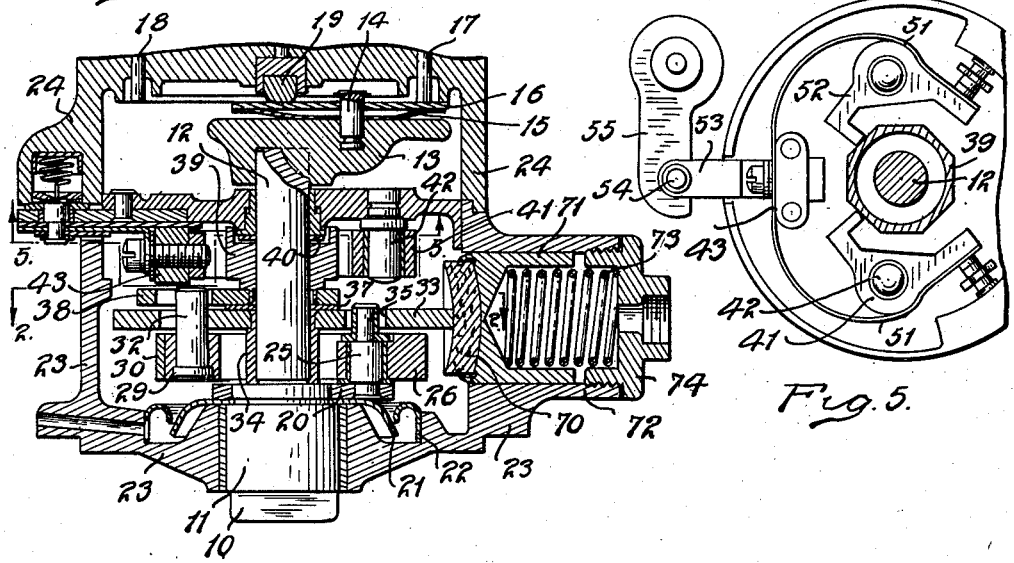
Inventors
RALPH H. SUMMERS
CLIFFORD COLVIN
BY
ATTORNEY.

March 12, 1940.  R. H. SUMMERS ET AL  2,192,957
IGNITION GOVERNOR
Original Filed Nov. 19, 1934   3 Sheets-Sheet 2
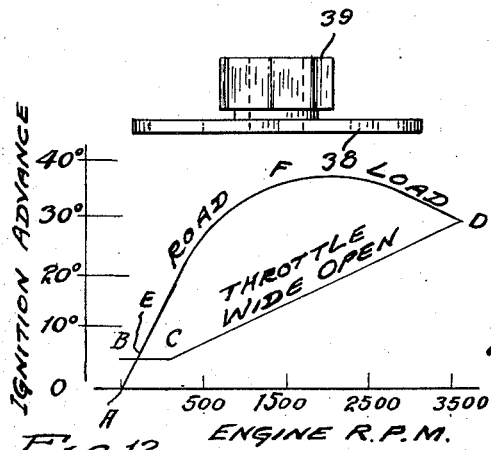
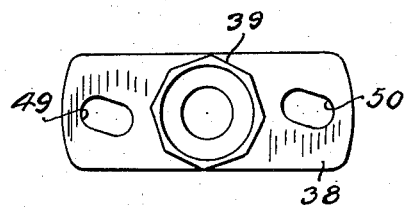
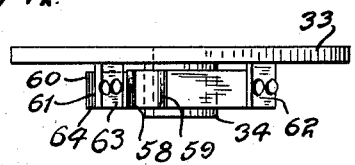
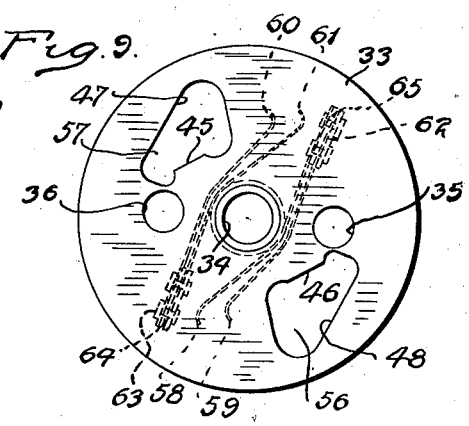
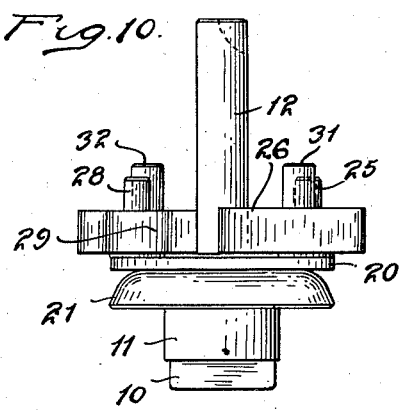
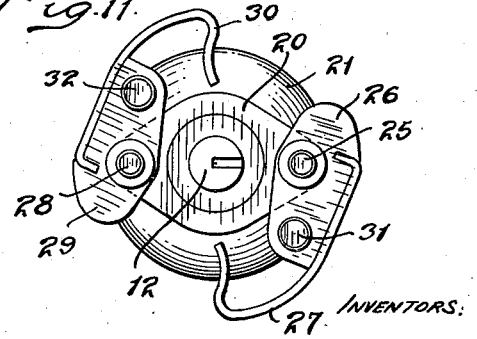
INVENTORS:
RALPH H. SUMMERS
CLIFFORD COLVIN
BY
ATTORNEY.

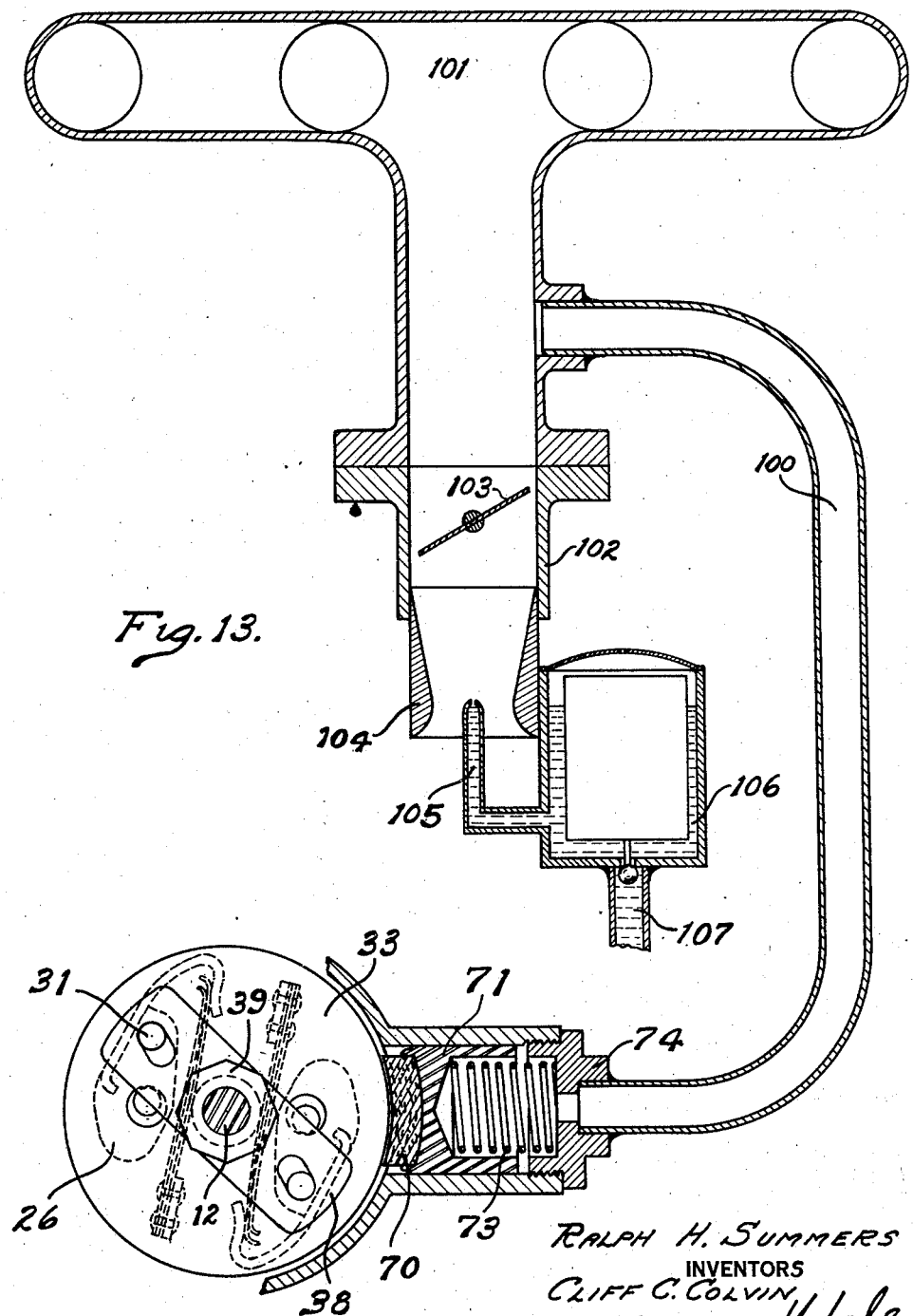

Patented Mar. 12, 1940

2,192,957

UNITED STATES PATENT OFFICE 2,192,957

IGNITION GOVERNOR

Ralph H. Summers and Clifford Colvin, Detroit, Mich., assignors to Geo. M. and Earl Holley Engineering, Detroit, Mich., a trust Application November 19, 1934, Serial No. 753,790
Renewed July 10, 1937

6 Claims. (Cl. 123—117)

This invention relates to governors for automobile ignition circuit breakers. Governors of this type have been designed for the last twenty years to advance with speed and to retard with load. However, the highest possible advance of the ignition under throttle has been limited to the highest possible advance with the carburetor throttle wide open. It is also desirable to have the minimum advance when idling and to advance the ignition where the load is first applied. The prior art devices are all designed to solve a specific problem. The applicant's invention presents a complete solution of a complicated problem.

The object of this invention is therefore to improve the construction of a centrifugally operated and load controlled governor designed to advance the timing of the ignition of an internal combustion engine whenever the load is reduced or the speed is increased. Specifically this object is accomplished by arranging so that the full load advance at minimum speed is greater than the no load advance at minimum speed and that the maximum advance at road load is higher than the maximum advance at full load.

An additional object is to accomplish the desired result by means of the inlet vacuum. Heretofore the vacuum control means have either retarded the ignition for idling or have advanced the ignition for light loads at running speeds.

Fig. 1 shows a cross sectional view taken on plane 1—1 of Fig. 2.

Fig. 2 is a cross sectional plan view taken on plane 2—2 of Fig. 1. This figure shows the low speed control means active at full load to advance the ignition.

Fig. 3 is a cross sectional plan view also taken on plane 2—2 of Fig. 1. This shows the load control means active at high speed to retard the ignition.

Fig. 4 is a cross sectional plan view taken on plane 2—2 of Fig. 1. This figure shows the load control means inactive and the engine running at high speed with maximum advance.

Fig. 5 shows a partial plan view looking upward on plane 5—5 of Fig. 1.

Fig. 6 shows in elevation the cam and cam plate.

Fig. 7 shows a plan view of the cam and cam plate.

Fig. 8 shows in elevation the governor control plate.

Fig. 9 shows a plan view looking down on the governor control plate.

Fig. 10 shows the driving shaft with the governor weights mounted thereon.

Fig. 11 shows the plan view of the driving shaft with governor weights.

Fig. 12 shows approximately the type of governor control characteristic obtainable with this governor, the low speed portion being slightly distorted.

Figure 13 shows the combination of our device with an ordinary internal combustion engine inlet manifold and carburetor.

DESCRIPTION

In the figures, 11 is the driving shaft, 10 is the driving ear therefor, 12 is an extension of the drive shaft, 13 is the high tension distributor arm mounted thereon, 15 is the spring for controlling the distributor arm 16 which is centrally mounted on the pivot 14 which is embedded in the insulation which forms the arm 13. 17 and 18 are two of the distributor outlets of the high tension terminal, 19 is the high tension terminal from the coil (not shown). These high tension distributor details are no part of this invention.

In Figures 10 and 11, 20 is a plate rigidly connected to 11 and carrying two pins 25 and 28. These pins have mounted thereon two centrifugal weights 26 and 29. These pins 25 and 28 extend upwards and engage with the governor control plate 33 (Fig. 9) through the holes 35 and 36. It will be noticed that these holes 35 and 36 are considerably larger than the pins 25 and 28 which engage with them. Except when in the extreme positions Figures 2, 3 and 4 the pins 25 and 28 can move freely in the large openings 35 and 36. A second pair of pins 31 and 32 are mounted on the governor weights 26 and 29 and also pass through the engine control plate 33 and extend therefrom to engage with the cam control plate 38. This cam control plate has two inclined slots 49 and 50 and the radial movement of the pins 31 and 32 in the slots in 38 and the inclination of these slots 49 and 50 determines the number of degrees that the cam 39 is advanced, the cam being riveted to the plate 38.

This cam operates the circuit breaker mechanism in Figure 5 and engages with the rocker arms 41 and 52 which are mounted on the pin 42 and which are controlled by a flat conducting spring 51 insulated and mounted at 43 and connected through an element 53 to a terminal 54 which is connected to 55 to a condenser not shown. The rocker arms are made of insulating material so that the current connected with the conductor 51 is only grounded when the cam 39 is disengaged from the rocker arms 51 and 52. This breaker mechanism is no part of this invention.

Governor control

This governor control, which is the novel feature of this invention, is shown in detail in Figures 8 and 9. The principal point of novelty in it is that the openings 56 and 57 are provided with inside, inclined rams 45 and 46 and outside, inclined ramps 48 and 47. Under certain conditions the pins 42 and 32 engage with the inside, inclined rams 45 and 46 and under other conditions they engage with the outside, inclined ramps 48 and 47. Connected with the plate 33 are the governor springs 60, 61, 58 and 59. These are bolted to ears connected to the plate 33. These ears are numbered 63 and 62. A spacer 64 is provided between 60 and 61 and a spacer 65 is provided between the springs 58 and 59. These springs engage with the governor arm extensions 30 and 27 (see Fig. 11). These springs are no part of my invention and coil springs of well known types may be substituted therefor.

A friction control is shown in Figures 1, 2 and 4 which comprises a friction pad 70 connected to a piston 71 which slides in a cylinder 72 and is controlled by a spring 73 which abuts against the cylinder cover 74 which is connected with the inlet manifold of an engine (not shown). The function of this piston and friction device to apply the governor load as a factor in combination with the governor speed, is also well known and is no part of my invention.

In Fig. 12, A, E, F, D represent the desired road curve, that is to say, the governor advances from the idle position of zero and then increases to nearly 40 degrees at 2500 R. P. M. and as the throttle is opened falls to 30 degrees at 3500 R. P. M. wide open throttle (D).

The letters B, C, D represent the initial advance with the low engine speed wide open throttle (full load curve). C represents the number of revolutions at which the governor commences to advance the ignition and to overcome the friction. D represents the maximum advance with the wide open throttle maximum speed. A, E, F, D, represents the road load curve which crosses B, C, D (load curve) at E. F is some five or ten degrees higher than D so that the maximum road load advance exceeds the maximum wide open advance. Figure 13 shows the vacuum piston cover 74 connected through a pipe 100 with a mixture manifold 101 to which is connected the throttle flange 102 in which is mounted the throttle 103 to which is connected the venturi 104, in the throat of which discharges the fuel nozzle 105 which obtains its fuel from the float chamber 106 to which is connected the fuel pipe 107.

Operation

The operation of the breaker mechanism and the distributor mechanism is no part of this invention and will therefore not be discussed. Considering the governor mechanism at low engine speed without any load: the springs 61 and 58 are strong enough to hold the governor weights 26—29 in the enclosed positions. That is, in the position corresponding to point A of Fig. 12. The governor control plate is free owing to the high vacuum which exists in the inlet manifold when the throttle is shut so that the friction pad 70 is drawn away from the edge of the governor control plate 33. As the engine speeds up the governor weights first overcome the outer spring 61 and then the stiffer inner spring 60. The pins 32—31 therefore progressively advance the cam 39 as they move out radially under the influence of the centrifugal force and engage with the slots 49 and 50 (Figure 7). When the load is applied at minimum engine speed, say at 200 revolutions per minute then the plate 33 is held by the friction pad 70. This forces the pins 31 and 32 outward slightly because the ramps 45 and 46 engage with the pins 31 and 32. This produces the sudden advance, A to B. Centrifugal force is still too weak to overcome the spring tension and the friction of the pad 70 and, hence, the governor characteristic remains horizontal on B—C (Figure 12). At C, say at 400 R. P. M., the centrifugal force of the governor weights overcomes both the springs and the friction and the ignition is advanced as the weights are thrown out in the well known manner. This produces the characteristic governor curve C—D. The reason why the ignition advance is limited to the point D is because the friction of 70 against the plate 33 causes the plate 33 to engage with the pin 25 and thus the outer ramps 47 and 48 engage with the pins 31 and 32 and this ramp which is in the opposite direction to the ramps 46 and 47 has a tendency to push the weights in and to thus retard the time of ignition.

At the low load wide open throttle (Fig. 4) the friction load is removed and the pins 31 and 32 move out to the greatest possible degree as limited only by the slots 49 and 50 (Fig. 7), the ramps 47 and 48 then being inoperative to interfere with the free movements of the weights which thereupon fly out to their extreme outermost position and thus give the ignition the maximum possible advance.

The separation of the curve A, E, F, D, from the curve B, C, D, is limited among other things by the clearance between the pins 25 and 28 in the holes 35 and 36.

The extreme movement of the pins 31 and 32 in the slots 49—50 is determined by the movement of the pins 31—32 against the ramps 47, 46, 48 and 45 but this movement is limited by the slope of these ramps and the clearance of the pins 25—28 in the holes 35—36.

What we claim is:

1. In an ignition advance mechanism for a throttle controlled internal combustion engine adapted for use on an automobile having a spring controlled centrifugal governor adapted to advance the time of ignition and having means responsive to the reduction in engine suction upon opening the throttle for increasing the tension on the governor spring comprising movable stop means for limiting the movement of the governor, said stop means being also responsive to the decrease in suction upon opening the throttle whereby the ignition mechanism at wide open throttle position has a lower maximum advance than is permitted under closed throttle conditions.

2. In an ignition advance mechanism for a throttle controlled internal combustion engine adapted for use on an automobile having a spring controlled centrifugal governor adapted to advance the time of ignition, driving means therefor, a plate having a loose driving connection with said driving means, means for limiting the angular movement of said plate relative to said driving means, said spring being adapted to be anchored to said plate, stop means for said governor located on said plate, and means responsive to the engine suction created by the throttle for moving the plate within the range of the loose driving connection relative to the governor whereby the stop means are moved to reduce the maximum movement of the governor weight when the engine is operating at its minimum suction with the throttle open.

3. In an ignition mechanism for a throttle controlled internal combustion engine adapted for use on automobiles, a rotatable driving shaft, a cam controlled circuit breaker operated thereby, centrifugally controlled governor weights mounted on said driving shaft and adapted to engage with said cam comprising a pair of governor weights mounted on pivots parallel with and connected to said driving shaft, a governor controlled plate interposed between the weights and the circuit breaker, a loose driving connection between this plate and the driving shaft so as to permit a limited movement between the plate and the driving shaft, means responsive to the reduction in suction created by opening the throttle for checking the rotation of this plate relative to the driving means, pins projecting from the governor weights, openings in the control plates adapted to embrace said pins, inclined ramps forming the walls of said openings and adapted to act as stops for said pins, so as to limit the outward movement of the governor weights when the rotation of the control plate is checked by the load responsive means, oppositely inclined ramps forming the inner walls of said openings adapted to limit the inward movement of the governor weights when the rotation of the control plate is checked when the throttle is opened, spring means mounted on said control plate adapted to engage with said weights whereby the spring tension on the governor weight is stiffened when the throttle is opened and the suction reduced, and driving means comprising a slotted plate connected to the circuit breaker cam and engaging with the pins projecting from and operated by the governor weights.

4. Ignition control means for a throttle controlled internal combustion engine adapted to be installed in an automobile comprising a governor with a weight mounted on a pivot parallel to and connected with a rotating shaft, a pin mounted on said governor weight, a governor controlled plate also mounted on said shaft, a loose driving connection between the plate and the driving shaft so as to permit a limited movement between the plate and the driving shaft, a spring mounted on said plate adapted to engage with said weight, an opening in said plate through which the governor pin extends, oppositely inclined ramps forming the walls of said openings and adapted to form stops for the movement of said pin, means responsive to the reduction in suction created by opening the throttle for opposing the rotation of said control plate and of said inclined ramps whereby the maximum and minimum movements of the governor weight are positively limited at full load as determined by the relative movement of the control plate and the drive shaft and the inclination of the inclined ramps in said plate.

5. In an ignition advance mechanism for a throttle controlled internal combustion engine adapted to be installed in an automobile comprising a spring controlled centrifugal governor adapted to advance the time of ignition, movable stops adapted to limit the movement of the governor both when the centrifugal force is weakest and when the centrifugal force is strongest, and means responsive to the reduction in suction created by opening the throttle adapted to move said movable stops.

6. In combination with a centrifugal governor adapted to advance the time of ignition with an increase in speed of a throttle controlled internal combustion engine adapted to be mounted in an automobile, movable governor control means therefor adapted to be placed in two positions so that when in its first position it permits the maximum retardation of the time of ignition at minimum engine speed and also permits the maximum advance in the time of ignition at maximum engine speed, and when in its second position it positively limits both the degree of retardation and the degree of advance and also the rate of advance with speed, and means responsive to the reduction in suction created by opening the throttle adapted to move the governor controlled means from its first position to its second position.

CLIFFORD COLVIN.
RALPH H. SUMMERS.